(12) United States Patent
Patil et al.

(10) Patent No.: US 7,967,992 B2
(45) Date of Patent: Jun. 28, 2011

(54) METHOD AND DEVICE INCORPORATING GRANULAR PARTICLES AND DISC-SHAPED PLASTIC PELLETS FOR FILTERING WATER

(75) Inventors: Arvind S. Patil, Davidson, NC (US); Glenn F. Cueman, Huntersville, NC (US)

(73) Assignee: Ricura Technologies, LLC, Hickory, NC (US)

( * ) Notice: Subject to any disclaimer, the term of this patent is extended or adjusted under 35 U.S.C. 154(b) by 646 days.

(21) Appl. No.: 11/339,106

(22) Filed: Jan. 25, 2006

(65) Prior Publication Data

US 2006/0163136 A1    Jul. 27, 2006

Related U.S. Application Data

(60) Provisional application No. 60/647,188, filed on Jan. 25, 2005.

(51) Int. Cl.
    *B01D 24/00*    (2006.01)
(52) U.S. Cl. .......................................... 210/807; 210/263
(58) Field of Classification Search .................. 210/807, 210/290, 501, 263
    See application file for complete search history.

(56) References Cited

U.S. PATENT DOCUMENTS

| | | | | |
|---|---|---|---|---|
| 3,876,546 A | * | 4/1975 | Hsiung et al. | .................. 210/275 |
| 4,407,865 A | * | 10/1983 | Nice | .............................. 427/217 |
| 4,563,161 A | * | 1/1986 | Zimmerman | .................. 446/156 |
| 6,171,496 B1 | * | 1/2001 | Patil | .............................. 210/484 |
| 6,319,400 B1 | * | 11/2001 | Hirs | .............................. 210/275 |

FOREIGN PATENT DOCUMENTS

JP    11116731 A  *  4/1999

* cited by examiner

*Primary Examiner* — Matthew O Savage
(74) *Attorney, Agent, or Firm* — Clements Bernard PLLC; Gregory N. Clements

(57) ABSTRACT

A novel water flow facilitator for granular filter devices that operate under gravity and contain granular particles, further consisting of plastic pellets that are 2 to 100 times, preferably 5 to 20 times larger than the granular particles; the plastic pellets having an aspect ratio of 0.5 to 10, preferably 1 to 4; that comprise about 1 to 50%, preferably 5 to 15% of the weight of the filter media; that have a specific gravity of 0.5 to 2, preferably 0.9 to 1.5. The plastic pellets should contain antimicrobial agents that protect the granular media from microbiological growth. The plastic pellets are made from any of the following plastics: polyolefins, various kinds of polyacrylates, polyvinyl polymers, nylon, polycarbonates etc. The plastic pellets may contain fillers such as calcium carbonate, titania, silica, or alumina. The invented flow facilitator is utilized in a gravity fed granular filter device to remove contaminants such as chlorine, taste and odor-causing compounds, solvents, pesticides, dissolved organic impurities, dissolved heavy metals and non-metallic impurities such as perchlorates. The invented flow facilitator is utilized in a gravity fed granular filter device in which the media consists of activated carbon, synthetic ion exchange resins, silica, alumina, titania, green sands, iron oxides or mixtures thereof.

10 Claims, 1 Drawing Sheet

Aspect Ratio = $\frac{L}{T} = \frac{2}{0.5} = 4$

Aspect Ratio = $\frac{L}{T} = 1$

Aspect Ratio = $\frac{L}{T} = 10$

METHOD AND DEVICE INCORPORATING GRANULAR PARTICLES AND DISC-SHAPED PLASTIC PELLETS FOR FILTERING WATER

CROSS REFERENCE TO RELATED APPLICATION

This application claims the benefit of U.S. Provisional Application No. 60/647,188, filed Jan. 25, 2005.

FIELD OF THE INVENTION

The present invention relates to a method and apparatus for facilitating liquid flow in a gravity flow granular filter device containing granular particles.

BACKGROUND OF THE INVENTION

Filtration devices using various kinds of granular media are used extensively in the treatment of water for removing all or a substantial part of various contaminants. At municipal and industrial applications these devices take the form of columns, vessels or fixed bed configurations, while at the Point-of-Use (POU) for consumer applications these are small tubular filter cartridges that can be inserted in line, in a municipal water distribution system, or more limited smaller scale water distribution system. While string wound, melt blown, or other kinds of non-woven fiber filters in similar tubular configuration are primarily intended to remove sediments from the water, filters containing granular media are designed to remove specific contaminants or impurities from the water. Depending on the nature of the contaminant, appropriate material having chemical and/or physical affinity for that particular contaminant or impurity is used. Typically the media having affinity for a particular contaminant is enclosed in a filter cartridge with an inlet port and outlet port, and the water requiring treatment is passed through the filter cartridge under some type of pressure. The contaminants should have sufficient time to contact the media, in order for the media to adsorb the contaminants thus purifying the water of that particular impurity. One of the most commonly used granular media is an activated carbon for removing color, odor and many types of dissolved organic impurities. Some other commonly used media are green sands, alumina, silica, titania, iron oxides and synthetic ion exchange resins.

Besides the POU filter devices that are attached to a pressurized water source, new types of POU filter devices known as Carafe or Pitcher filters have come into vogue, requiring the flow of water through them by gravity. These filter devices are typically used in a kitchen for removal of dissolved chlorine and to improve the taste of water either for drinking or for cooking purposes. Water, to be purified in small batches on the order of 1 to 2 liters, is poured into a reservoir containing the filter and the gravity output from the filter is collected in an another reservoir located underneath the filter. The considerations required here to select the proper particle size of the media to achieve certain flow rate and capability to reduce the contaminants from the water are quite different than for the POU filter devices that are pressurized. Consumers typically demand a flow rate of about 150 to 350 cc/min from these pitcher devices to be practical for everyday use, otherwise it takes too long to treat the 1 to 2 liters of water that the consumer needs either for drinking or cooking in an kitchen type environment.

The Problem Presented:

In a typical application involving granular media, water containing impurities or contaminants is brought into contact with the media to adsorb the contaminants onto the media and thus purify the water. The effectiveness of this operation depends on the adsorption capacity of the media for the particular impurity and the contact time during which the media has the opportunity to remove the impurity from the water. Even with the optimum adsorption capacity of the media for the impurity, if the contact time with the media is insufficient, the impurity will not be fully removed from the water. In filtration technology, Empty-Bed-Contact-Time (EBCT) expresses these kinds of solid/liquid contact considerations quantitatively. EBCT is a ratio of volume of vessel or filter cartridge containing the media to the flow rate of water through it (e.g., volume in cc of filter cartridge filled with media divided by cc/min flow rate). The resultant ratio gives time in minutes that the water is in contact with the media. It makes a big difference in the EBCT whether the treatment device is pressurized or not pressurized, as a pressurized device usually has a higher flow rate resulting in EBCT that is much less. The EBCT for pressurized systems is usually in the range of 1 to 10 seconds, whereas gravity flow systems have EBCT that is one or two orders of magnitude higher, i.e., 10 to 100 seconds. For comparison, the EBCT for large industrial and municipal applications using media in large columns and vessels is 5 to 15 minutes. Here the vessels or columns containing the media can be made sufficiently large (and they are usually arranged in series) to achieve a flow rate of 20 to 50 gallons per minute with adequate EBCT to effectively remove the contaminant. The flow rates of pressurized POU filter devices are usually in the range of 0.5 to 2 gpm, while those in pitcher filters are in the range of about 150 to 300 cc/min (0.04 to 0.08 gpm).

Even though flow rates of 150 to 300 cc/min typically found in pitcher filters allow higher contact time, they have severe size limitations. This means that only a limited quantity of granular media can be accommodated within these gravity fed filter cartridges and any slight advantage of higher contact over the pressure driven devices is nullified. This leads to an inability to remove a wide range of contaminants from these gravity driven filter devices.

One possible solution to the problem of insufficient contact time in a restrictive sized filter device is to increase the surface area of the media by using finer particle sizes. This usually achieves two purposes:

1) It increases the adsorption capacity per unit weight of the media, or more specifically per unit volume of the filter housing, and 2) It achieves better contact with the more exposed surfaces of the media. This however leads to another problem, that of reduction of flow rate under gravity. By using finer granular media, the minimum required flow rate of 150-300 cc/min is unattainable, even though the ability of the filter to remove a wide range of contaminants is vastly improved. The present invention provides a solution to this problem by the use of a novel flow facilitator that allows achievement of higher flow rate either by using finer granular media or by increasing the weight of the media, i.e., the height of the column, within the gravity driven filter cartridge.

SUMMARY OF THE INVENTION

The invention is a novel water flow facilitator for granular filter devices that operate under gravity and contains granular particles in the size range of 2500 to 25 microns, and further includes plastic pellets that are 2 to 100 times, preferably about 5 to 20 times larger than the granular particles; have an aspect ratio of 0.5 to 10, preferably about 1 to 4; that advantageously have a round disc shape; that comprise about 1 to 50% of the weight of the filter media, preferably about 5 to 15% of the weight of the filter media; that have a specific gravity of 0.5 to 2, preferably about 0.9 to 1.5. The plastic pellets should contain antimicrobial agents that protect the granular media from microbiological growth. The plastic pellets are advantageously made from any of the following plastics: polyolefins, various kinds of polyacrylates, polyvinyl polymers, nylon, polycarbonates, etc. The plastic pellets may contain fillers such as calcium carbonate, titania, silica, or alumina.

The invented flow facilitator is utilized in a gravity fed granular filter device to remove contaminants such as chlorine, taste and odor-causing compounds, solvents, pesticides, dissolved organic impurities, dissolved heavy metals and non-metallic impurities such as perchlorates.

The invented flow facilitator is utilized in a gravity fed granular filter device in which the media consists of activated carbon, synthetic ion exchange resins, silica, alumina, titania, green sands, iron oxides or mixtures thereof.

OBJECTS OF THE INVENTION

The principal object of the present invention is to provide a filter device for liquids having an improved and optimal level of filtration performance, while maintaining a convenient or desired flow rate.

Another object of the invention is to provide a filter device that has antimicrobial protection.

BRIEF DESCRIPTION OF THE DRAWINGS

The foregoing and other objects will become more readily apparent by referring to the following detailed description and the appended drawings in which.

DETAILED DESCRIPTION

Figure 1:
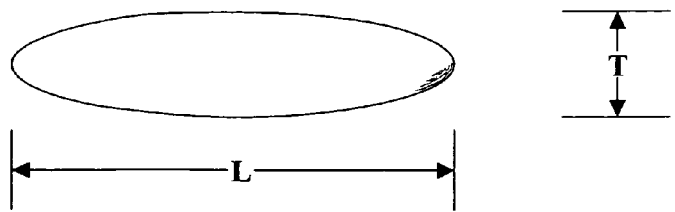
FIG. 1 depicts a suitable granular particle, consisting of a plastic pellet having a round disc shape with an aspect ratio of 4.
Figure 2:
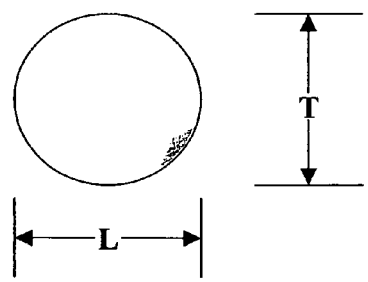
FIG. 2 depicts a suitable granular particle, consisting of a plastic pellet having a spherical shape with an aspect ratio of 1.
Figure 3:
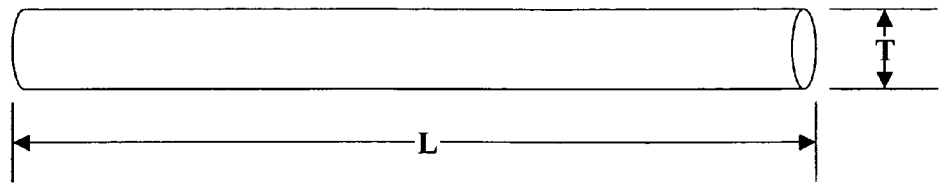
FIG. 3 depicts a suitable granular particle, consisting of a plastic pellet having a rod shape with an aspect ratio of 10.

In the invention, a granular filter device contains a granular adsorbent filter media, in one of the following size ranges:

| MESH SIZE | PARTICLE SIZE (Micron) |
| --- | --- |
| 8 × 20 | 2380-841 |
| 12 × 40 | 1680-420 |
| 20 × 50 | 841-297 |
| 60 × 80 | 250-177 |
| 80 × 325 | 177-44 |
| <325 | <44 |

"Mesh" throughout this application means American Mesh sizes (ASTM-E-11-61). For the gravity applications of the invention, 12×40, 20×50 and 60×80 are the preferred mesh sizes. The broad range of granular particle sizes is 2500 to 25 microns, with the preferred size being between 1680 to 177 microns.

In the present invention, extruded plastic pellets are added to the granular media. The plastic particles preferably are quenched in water, and have a specific gravity of about 0.8 to 1.5. They are larger in diameter by 2 to 100 times, but preferably about 5 to 20 times, the diameter of the granular media, and they are 1 to 50%, preferably about 7 to 15%, of the weight of the granular media.

The plastic pellets or granules are preferably impregnated with antimicrobial compounds, which leach the active ingredients in safe, minute amounts, to protect the filter media and the filter components from microbial growth. Suitable antimicrobial compounds are silver (elemental silver or nanoparticle silver), zinc, silver-zinc-zeolites, Triclosan (2,4,4'-trichloro-2'-hydroxydiphenyl ether), diiodomethyl-4-tolylsulfone; zinc 2-mercaptopyridine-N-oxide; N-alkyl-N,N-dimethyl-N-benzylammonium chloride; sodium-O-phenylphenate; 1-5 pentanedial(Glutaraldehyde); 2,2-dibromo-3-nitrilopropionamide; and cis 1-(3-chloroallyl)-357-triaza-1-azoniaadamantane.

The plastic pellets may also contain fillers such as calcium carbonate to adjust their specific gravity.

By using these plastic pellets, at 5 to 15% of the weight of the granular media, which is 5 to 25 times smaller than the pellets, we are able to maintain the flow rate in a gravity fed pitcher filter, while removing a wide range of contaminants. Our ability to utilize finer particle sizes in granules to improve the adsorption kinetics of the media without reducing the flow rate of the device appreciably, distinguishes our invention from the prior art in this field. We have been able to utilize higher amounts of granular materials in the filter device than was possible before, given the flow rate requirements of the device. By impregnating the plastic pellets with antimicrobial additives, we are further able to protect the granular material from bacterial growth.

The optimum shape for the plastic pellets is a disc with an aspect ratio of 2. By quenching these pellets in water, one obtains the optimum disc shape. The plastics utilized to make the pellets can be plastics such as polyethylene, polypropylene, acrylates, methyl acrylates, ethyl methacrylates, polyester, nylon, polycarbonates, or polyvinyls, which must be safe to use in drinking water applications. Since these plastics have a range of specific gravities and since the antimicrobial compounds such as silver, zinc, silver-zinc-zeolites, or triclosan have different specific gravities, the resultant pellets will be expected to have a range of specific gravities. The specific gravity can be further adjusted by addition of fillers such as calcium carbonate, silica, titania, and alumina. The optimum specific gravity for water applications should preferably be greater than 1, however a specific gravity of 0.9 and above is satisfactory for certain applications.

SUMMARY OF THE ACHIEVEMENT OF THE OBJECTS OF THE INVENTION

From the foregoing, it is readily apparent that we have invented an improved filter device for liquids having an improved and optimal level of filtration performance, while maintaining a convenient or desired flow rate, and which filter device that has antimicrobial protection.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

We claim:

1. A granular filter device comprising: a filter medium for removing water soluble contaminants, wherein said filter medium contains granular particles having a size range of 2500 to 25 microns, and plastic pellets that are substantially round, disc-like in shape therein, having:
a particle size range 2 to 100 times that of the granular particles, from 1 to 50% of the total weight of the filter medium;
a specific gravity of 0.5 to 2.0; and
wherein said plastic pellets contain and are impregnated with an antimicrobial additive.

2. Apparatus according to claim 1, wherein the particle size range of the plastic pellets is from 5 to 20 times that of the granular particles.

3. Apparatus according to claim 1, wherein the plastic pellets are from 5 to 15% of the total weight of the filter medium.

4. Apparatus according to claim 1 wherein the specific gravity of the plastic pellets is from 0.9 to 1.5.

5. Apparatus according to claim 1 wherein the antimicrobial additive is selected from the group consisting of silver (elemental silver or nanoparticle silver), zinc, silver-zinc-zeolites, Triclosan (2,4,4'-trichloro-2'-hydroxydiphenyl ether), diiodomethyl-4-tolylsulfone; zinc 2- mercaptopyridine -N-oxide; N-alkyl -N,N-dimethyl-N-benzylammonium chloride; sodium-O-phenylphenate; 1-5pentanedial(Glutaraldehyde); 2,2-dibromo-3-nitrilopropionamide; and cis 1-3-chloroallyl)-3 5 7-triaza-1-azoniaadamantane.

6. Apparatus according to claim 1 wherein the plastic pellets are made from plastics selected from the group of plastics consisting of polyolefins, acrylates, polyacrylates, polypropylene, polyesters, polyvinyl polymers, nylon, and polycarbonates.

7. Apparatus according to claim 6, wherein said plastic pellets further include a filler selected from the group consisting of calcium carbonate, silica, titania, alumina, or mixtures thereof.

8. Apparatus according to claim 1 wherein the granular particles are selected from the group consisting of activated carbon, silica, alumina, titania, green sands, iron oxides, synthetic ion exchange resins, and mixtures thereof.

9. Apparatus according to claim 1 wherein the granular particles have a size range from about 1680 to 177 microns.

10. A method of filtering water soluble contaminants from water, comprising:
a) providing a cartridge containing a filter media consisting of: 50 to 99% by weight granular particles having a particle size in the range of from 2500 to 25 microns, the granular particles being selected from the group consisting of activated carbon, silica, alumina, titania, green sands, iron oxides, synthetic ion exchange resins, and mixtures thereof; and
1 to 50% by weight plastic pellets that are substantially round, disc-like in shape having:
a particle size range 2 to 100 times that of the granular particles,
a specific gravity of 0.5 to 2.0, and
said plastic pellet contain and are impregnated with an antimicrobial compound,
b) passing water to be filtered therethrough via gravity or under low flow rate up to 2 gallons per minute.

* * * * *